United States Patent [19]

Tabayashi et al.

[11] Patent Number: 4,878,946

[45] Date of Patent: Nov. 7, 1989

[54] HOT-MELT TYPE INK FOR THERMAL INK-JET PRINTER

[75] Inventors: Isao Tabayashi, Kuki; Hiroshi Harada, Takaishi; Sadahiro Inoue, Chiba; Hiroshi Fukutomi, Urawa, all of Japan

[73] Assignee: Dainippon Ink and Chemicals, Inc., Tokyo, Japan

[21] Appl. No.: 160,877

[22] Filed: Feb. 26, 1988

[30] Foreign Application Priority Data

Feb. 27, 1987 [JP] Japan .................................. 61-42846

[51] Int. Cl.$^4$ ............................................. C09D 11/06
[52] U.S. Cl. ........................................ 106/27; 106/20; 106/22
[58] Field of Search .............................. 106/22, 20, 27

[56] References Cited

PUBLICATIONS

Derwent Abstract Accession No. 84-130202/21, Japanese Pat. No. 59-064678, Apr. 12, 1984.
Derwent Abstract Accession No. 86-090862/14, Japanese Pat. No. 61-036381, Feb. 21, 1986.
Derwent Abstract Accession No. 86-090863/14, Japanese Pat. No. 61-036382, Feb. 21, 1986.
Derwent Abstract Accession No. 86-158858/25, Japanese Pat. No. 61-091276, May 9, 1986.
Derwent Abstract Accession No. 86-254901/39, Japanese Pat. No. 61-181879, Aug. 14, 1986.

Primary Examiner—Amelia Burgess Yarbrough
Attorney, Agent, or Firm—Armstrong, Nikaido, Marmelstein, Kubovcik & Murray

[57] ABSTRACT

A hot-melt type ink for thermal ink-jet printers comprises an oil-soluble dye dissolved in at least one compound selected from the group consisting of a phosphoric acid ester, an aromatic sulfonamide, a hydroxybenzoic acid ester and a phthalic acid ester, the compound being in solid state at room temperature.

7 Claims, No Drawings

HOT-MELT TYPE INK FOR THERMAL INK-JET PRINTER

BACKGROUND OF THE INVENTION

1. Field of the Invention

The present invention relates to a hot-melt type ink for use in a thermal ink-jet printer which projects a heat-melted ink-jet through a thermal head.

2. Prior Art

Several systems have been proposed for ink-jet recording: electric field controlled jet that is ejected under an electrostatic attractive force; drop-on-demand ink (impulse jet) that is ejected under the oscillating pressure created by a piezoelectric transducer; and thermal ink jet that is ejected under the pressure created by air bubbles formed and grown with heat. These and other known methods of ink-jet recording are capable of producing image of a very high resolution.

Inks used in ink-jet printers are generally of two types: water-based inks which employ water as the principal solvent, and organic solvent-based inks which employ organic solvents as the principal solvent. Images printed with water-based inks are usually low in water resistance whereas organic solvent-based inks are capable of providing printed images with improved water resistance.

However, these water- and organic solvent-based inks, which are liquid at room temperature, will be liable to blot the recording paper upon printing and are not usable to give a satisfactory printing density. Furthermore, the liquid nature of these inks causes high incidence of deposition of crystallizable matter from the inks and this has been a major cause of undesirably low reliability of the conventional ink-jet recording systems.

With a view to eliminate the defects of these prior art inks of the solution type, the use of hot-melt type inks that are solid at room temperature has been proposed as inks for thermal ink-jet printers. For example, U.S. Pat. No. 3,653,932 proposes an ink containing a dialkyl ester of sebacic acid; U.S. Pat. No. 3,715,219 discloses an ink containing a higher aliphatic alcohol; U.S. Pat. No. 4,390,369 shows an ink containing a natural wax; EP 99,682 proposes an ink containing stearic acid; and U.S. Pat. No. 4,659,383 discloses an ink that contains an acid or alcohol of $C_{20}$–$C_{24}$, optionally in the presence of a ketone having a comparatively high melting point. However, not all of these inks exhibit high solubility of dyes and the types of dyes that can be used are limited. In addition, these inks have not necessarily been stable against prolonged heating or repeated heat cycles. EP 181,198 discloses a hot-melt type ink that has a solid pigment dispersed in a wax having a melting point higher than 65° C. or an aliphatic acid or alcohol of $C_{18}C_{24}$ This ink, however, has the problem of poor dispersion stability.

SUMMARY OF THE INVENTION

An object of the present invention is to provide a hot-melt type ink that can be ejected consistently in thermal ink-jet printers to produce printed images of good quality.

The object of the preset invention can be attained by a hot-melt type ink for thermal ink-jet printers that has an oil-soluble dye dissolved in at least one compound that is solid at ambient temperature and which is selected from the group consisting of a phosphoric acid ester, an aromatic sulfonamide, a hydroxybenzoic acid ester and a phthalic acid ester (this compound is hereinafter referred to as a dye solvent.)

The ink of the present invention can be ejected in a very stable way under prolonged continuous heating or even under intermittent heat cycles. This ink can be stored for a prolonged period of time without deterioration of its properties and ensures the production of printed images of high quality.

According to the present invention, there is provided a hot-melt type ink for thermal ink-jet printers which comprises an oil-soluble dye dissolved in at least one compound selected from the group consisting of a phosphoric acid ester, an aromatic sulfonamide, a hydroxybenzoic acid ester and a phthalic acid ester, the compound being in the solid state at room temperature.

DETAILED DESCRIPTION OF THE INVENTION

Suitable examples of the dye solvent that can be used in the present invention include phosphoric acid esters such as triphenyl phosphate, tri-p-tolyl phosphate, etc; aromatic sulfonamides such as N-cyclohexyl-p-toluenesulfonamide, N,N-dichloro-p-toluenesulfonamide, N-butyl-p-toluenesulfonamide, benzenesulfonamide, p-toluenesulfonamide, o-toluenesulfonamide, benzylsulfonamide, etc; hydroxybenzoic acid esters such as ethyl p-hydroxybenzoate, n-propyl p-hydroxybenzoate, iso-propyl p-hydroxybenzoate, n-butyl p-hydroxybenzoate, iso-butyl p-hydroxybenzoate, n-heptyl p-hydroxybenzoate, n-nonyl p-hydroxybenzoate, phenyl salicylate, octyl salicylate, p-tert-butylphenyl salicylate, etc; and phthalic acid esters such as dicyclohexyl phthalate, diethyl phthalate, dodecyl phthalate, diphenyl phthalate, dimethyl iso-phthalate, dimethyl terephthalate, diethyl terephthalate, etc. These dye solvents have high affinity for dyes and create a molten state in which dyes remain dissolved in a very stable manner. These dye solvents may be used alone, or as admixtures in order to increase the tolerance for such factors as dye solubility, the temperature at which the ink is melted, and the viscosity of ink.

Any oil-soluble dye that is soluble in the aforementioned dye solvents can be used in the present invention without any particular limitation. Typical useful dyes include azo dyes, metal complex salt dyes, naphtholic dyes, anthraquinone dyes, indigo dyes, carbonium dyes, quinoimine dyes, cyanine dyes, quinoline dyes, nitro dyes, nitroso dyes, benzoquinone dyes, naphthoquinone dyes, naphthalimide dyes, perinone dyes and phthalocyanine dyes. These oil-soluble dyes are preferably incorporated in the ink of the present invention in amounts of 0.1–10 wt. %, with the range of 0.5–5 wt % being more preferred.

In order to control various ink properties such as the temperature at which it is melted and its viscosity, the ink of the present invention may optionally incorporate additives in amounts that will not impair its ability to assume a solid state at room temperature. Illustrative additives that can be used for this purpose include liquid plasticizers, waxes such as higher aliphatic alcohols, natural waxes and higher aliphatic acids, and stabilizers such as antioxidants.

The ink of the present invention which is intended to be used in thermal ink-jet printers ensures very stable ink ejection under prolonged continuous heating or even under intermittent heating and cooling cycles. In addition, it exhibits good keeping quality over a prolonged period and a printed image is produced in high quality.

The following examples are provided for the purpose of further illustrating the present invention but are in no way to be taken as limiting. In Examples, all percents are by weight.

EXAMPLE 1

Oil-soluble black dye (chromium premetallized dye) 3.5%
Phenyl salicylate (m.p. 44° C.) 76.5%
N-Cyclohexyl-p-toluenesulfonamide (m.p. 84° C.) 20.0%

The above ingredients were mixed with vigorous stirring at 60° C. to form a complete solution. With the temperature held at 60° C., the solution was filtered through a membrane filter (0.45μm in pore size) to make a hot-melt type ink. Continuous jet formation with this ink heated at 70° C. on a drop-on-demand ink-jet printer produced stable ink ejection even after 300 hours. The ink remained stable in solution even after 100 heating and cooling cycles were run and it was successfully ejected in a consistent manner. In all instances, the print was clean and the image was produced in very good quality.

EXAMPLE 2

Oil-soluble black dye (nigrosine dye) 4.0%
Phenyl salicylate (m.p. 44° C.) 96.0%

The above ingredients were mixed with vigorous stirring at 60° C. to form a complete solution. With the temperature held at 60° C., the solution was filtered through a membrane filter (0.45 μm in pore size) to make a hot-melt type ink. Continuous jet formation with this ink heated at 60° C. on a drop-on-demand ink-jet printer produced stable ink ejection even after 300 hours. The ink remained stable in solution even after 100 heating and cooling cycles were run and it was successfully ejected in a consistent manner. In all instances, the print was clean and the image was produced in very good quality.

EXAMPLE 3

Oil-soluble cyan dye (phthalocyanine dye) 3.5%
n-Heptyl p-hydroxybenzoate (m.p. 47° C.) 96.5%

The above ingredients were mixed with vigorous stirring at 50° C. to form a complete solution. With the temperature held at 50° C., the solution was filtered through a membrane filter (0.45 μm in pore size) to make a hot-melt type ink. Continuous jet formation with this ink heated at 60° C. on an electric field controlled ink-jet printer produced stable ink ejection even after 300 hours. The ink remained stable in solution even after 100 heat cycles were run, and it was successfully ejected in a consistent manner. In all instances, the print was clean and the image was produced in very good quality.

EXAMPLE 4

Oil-soluble yellow dye (azo dye) 3.0%
Triphenyl phosphate (m.p. 49° C.) 97.0%

The above ingredients were mixed with vigorous stirring at 60° C. to form a complete solution. With the temperature held at 60° C., the solution was filtered through a membrane filter (0.45 μm in pore size) to make a hot-melt type ink. Continuous jet formation with this ink heated at 60° C. on a field controlled ink-jet printer produced stable ink ejection even after 500 hours. The ink remained stable in solution even after 100 heating and cooling cycles were run and it was successfully ejected in a consistent manner. In all instances, the print was clean and the image was produced in very good quality.

EXAMPLE 5

Oil-soluble magenta dye (rhodamine dye) 2.0%
Dicyclohexyl phthalate (m.p. 61° C.) 98.0%

The above ingredients were mixed with vigorous stirring at 80° C. to form a complete solution. With the temperature held at 80° C., the solution was filtered through a membrane filter (0.45μm in pore size) to make a hot-melt type ink. Continuous jet formation with this ink held at 80° C. on a drop-on-demand ink-jet printer produced stable ink ejection even after 300 hours. The ink remained stable in solution even after 100 heating and cooling cycles were run and it was successfully ejected in a consistent manner. In all instances, the print was clean and image was produced in very good quality.

EXAMPLE 6

Oil-soluble black dye (nigrosine dye) 3.0%
n-Butyl p-hydroxybenzoate (m.p. 72° C.) 20.0%
Montanic acid ester wax (m.p. 79°–85° C.) 77.0%

The above ingredients were mixed with vigorous stirring at 100° C. to form a complete solution. With the temperature held at 100° C., the solution was filtered through a membrane filter 0.45μm in pore size) to make a hot-melt type ink. Continuous jet formation with this ink heated at 110° C. on a drop-on-demand ink-jet printer produced stable ink ejection even after 500 hours. The ink remained stable in solution even after 100 heating and cooling cycles were run and it was successfully ejected in a consistent manner. In all instances, the print was clean and the image was produced in very good quality.

COMPARATIVE EXAMPLE 1

Oil-soluble black dye (nigrosine dye) 3.0%
Montanic acid ester wax (m.p. 79–85° C.) 47.0%
Stearic acid (m.p. 70° C.) 50.0%

The above ingredients were mixed with vigorous stirring at 110° C. to form a complete solution. With the temperature held at 110° C., the solution was filtered through a membrane filter (0.45μm in pore size) to make a hot-melt type ink. In a continuous jet formation test conducted at 110° C. on a drop-on-demand ink-jet printer, the ink started to be ejected abnormally in 100 hours. The print lacked some degree of sharpness and the image it produced was somewhat inferior to that attained in Example 2.

After the ink had been subjected to 100 heating and cooling cycles, a jet formation test was conducted on a drop-on-demand ink-jet printer at 100° C. but abnormal ink ejection immediately occurred.

COMPARATIVE EXAMPLE 2

Oil-soluble black dye (nigrosine dye) 4.0%
Montanic acid ester wax (m.p. 79°–85° C.) 96.0%

The above ingredients were mixed under vigorous stirring at 110° C. but the dye did not dissolve in the wax. The dye was therefore dispersed in the wax by agitation with a ball mill for 10 hours at 100° C. With the temperature held at 100° C., the dispersion was filtered through a membrane filter (5 μm in pore size) to make a hot-melt type ink. This ink was subjected to a continuous jet printing on a drop-on-demand ink-jet printer at 110° C., but abnormal ink ejection immediately occurred.

While the invention has been described in detail and with reference to specific embodiments thereof, it will be apparent to one skilled in the art that various changes and modifications can be made therein without departing from the spirit and scope thereof.

What is claimed is:

1. A hot-melt type ink for thermal ink-jet printers which comprises an oil-soluble dye dissolved in at least one compound selected from the group consisting of a phosphoric acid ester, a hydroxybenzoic acid ester and a phthalic acid ester, the compound being in solid state at room temperature.

2. An ink according to claim 1 wherein the phosphoric acid ester is triphenyl phosphate.

3. An ink according to claim 1 wherein the hydroxybenzoic acid ester is phenyl salicylate.

4. An ink according to claim 1 wherein the hydroxybenzcic acid ester is n-butyl p-hydroxybenzoate.

5. An ink according to claim 1 wherein the hydroxybenzoic acid ester is n-heptyl p-hydroxybenzoate.

6. An ink according to claim 1 wherein the phthalic acid ester is dicyclohexyl phthalate.

7. An ink according to any one of the preceding claims which contains the oil-soluble dye of an amount of 0.1–10 wt. %

* * * * *